Patented Oct. 13, 1953

2,655,524

UNITED STATES PATENT OFFICE 2,655,524

ADDITION COMPOUNDS OF AMINES AND HALIDES OF ALUMINUM AND BORON

Frank J. Sowa, Crandon, N. J.

No Drawing. Application April 11, 1951,
Serial No. 220,541

15 Claims. (Cl. 260—448)

This invention relates to addition compounds of amines and halides of aluminum and boron and to a method for their production.

It is known to prepare addition compounds by the reaction of short-chain amines (e. g., monomethylamine, monoethylamine, mono-i-amylamine, dimethylamine, di-i-amylamine, triethylamine, diethylaniline, etc.) and aluminum halides (e. g., aluminum tribromide) or boron halides (e. g., boron tribromide). These compounds are, however, unstable when dissolved in water, and as a result are useless in water solution. It is also known to prepare addition compounds by the reaction of boron trifluoride and short-chain amines, such as triethylamine.

It is therefore an object of this invention to provide a new series of addition products of amines and halides of aluminum and boron which are stable in water and as a result have increased utility. The new addition compounds, more particularly the addition products of amines and boron trifluoride, are, however, much more soluble in various organic solvents than in water, and thus have a broader scope of utility than merely in aqueous solution.

It is also an object of this invention to provide a new series of addition products of amines and halides of aluminum and boron which possess valuable properties as detergents, wetting agents and emulsifying agents.

It is a further object of this invention to provide a series of compounds which are useful antiseptics, bactericides, larvicides, insecticides, and fungicides.

These and other objects are accomplished by preparing a compound having the generic formula $(R_3N)_n EX_3$ or $[(R_3N)_n EX_{4-n}] \cdot (n-1) X$ in which at least one R attached to each nitrogen atom is attached to that nitrogen atom by means of a terminal carbon atom and is selected from the group consisting of straight-chain alkyl radicals having from eight to eighteen carbon atoms, straight-chain alkenyl radicals having from eight to eighteen carbon atoms and straight-chain alkadienyl radicals having from eight to eighteen carbon atoms, the remaining R's, if any, being a substituent selected from the group consisting of hydrogen, alkyl radicals having from one to five carbon atoms, the cyclohexyl radical, the phenyl radical and the benzyl radical, E is an element selected from the group consisting of aluminum and boron, X is a halide, that is an element selected from the group consisting of chlorine, bromine, fluorine, and iodine, and $n$ is an integer from one to four. In accordance with this invention, it has been discovered, in order for the addition compounds to be stable in water and to satisfy the other objects above-stated, that at least one R radical attached to each nitrogen atom must have at least eight carbon atoms extending in a straight chain from such atom.

The following examples illustrate in detail the method for the preparation of various compounds which fall within the aforementioned generic formula.

Example No. I 10 gms. of anhydrous aluminum trichloride was dissolved in 1000 ml. of ether, forming a clear solution to which there was then slowly added 56 gms. of monolaurylamine (4 mols per mol of aluminum trichloride). An exothermic reaction took place, and after the reaction had been completed and the reaction mixture had cooled a white crystalline precipitate was present on the bottom of the reaction flask. This precipitate was then separated by means of filtration, and was recrystallized from a solvent composed of equal volumes of acetone and ethyl acetate. The ether filtrate was subjected to vacuum distillation to remove the ether, and there remained a residue of monolaurylamine amounting to 28 gms., showing that the precipitate which was purified by crystallization from the acetone-ethyl acetate solvent was an addition compound formed by the reaction of two molecules of monolaurylamine and one molecule of aluminum trichloride. This compound had a melting point of 173° C. and dissolved in water without decomposition. The following table indicates the effect on the surface tension of water of adding various concentrations of the addition product thereto.

| Surface tension at 25° C. | Concentration |
|---|---|
|  | Percent |
| 30.3 dynes/cm | 1 |
| 35.1 | .1 |
| 51.6 | .01 |

Example No. II 13.3 gms. of anhydrous aluminum trichloride was dissolved in 150 ml. of benzene, and to the solution there was then added slowly with continuous stirring 111 gms. of monolaurylamine, An exothermic reaction took place, and therefore during the addition of the amine the flask was cooled to a temperature which maintained the benzene reflux. After the reaction was completed and the reaction mixture had cooled to room temperature, there remained in the reaction flask a precipitate. The excess benzene was then separated from the precipitate, which was thereafter recrystallized from solution in ethyl acetate to yield 84.6 gms. of product having a melting range of 165–168° C. (decomposition began as the product melted). An analysis of the product showed that it was the substantially pure addition compound formed by the reaction of four molecules of the amine and one molecule of the aluminum trichloride. The product was soluble in water without decomposition, and was a useful detergent.

Example Nos. III–VI which follow illustrate the preparation of the addition compounds of four, three, two and one molecules of monolaurylamine and one molecule of boron trichloride.

Example No. III 59.2 gms. of monolaurylamine was dissolved in 100 ml. of benzene, and 9.4 gms. of boron trichloride (liquefied in a Dry Ice-alcohol bath) was dissolved in 25 ml. of benzene cooled to 5° C. The boron trichloride solution was then added slowly with stirring to the amine solution. A vigorous exothermic reaction took place, so that a condenser cooled with a Dry Ice-acetone mixture was employed to prevent the escape of the boron trichloride. After the reaction was completed and the reaction mixture had cooled to room temperature, there remained on the bottom of the reaction flask a heavy precipitate, which was separated from the benzene by filtration. The precipitate was recrystallized three times from solution in ethyl acetate, yielding 50.2 gms. of product having a melting range of 148–154° C. A spectrophotometric analysis of this product showed that it was essentially the addition compound formed by the reaction of four molecules of the amine and one molecule of the boron trichloride.

Example No. IV

In this example the procedure was the same as that described for Example III, except that 55.5 gms. of monolaurylamine and 11.7 gms. of boron trichloride were used as the reactants. The yield of product after the third recrystallization was 45.5 gms. of material having a melting range of 163–169° C. A spectrophotometric analysis of this compound showed that it was the substantially pure addition compound formed by the reaction of three molecules of the amine and one molecule of the boron trichloride.

Example No. V

The procedure followed in this example was the same as that employed in Example III, except that 55.5 grams of monolaurylamine and 17.7 gms. of boron trichloride were used as reactants. The yield of product after the third recrystallization was 66 gms. of material having a melting range of 173–175° C. A spectrophotometric analysis of this product showed that it was the substantially pure addition compound formed by the reaction of two molecules of monolaurylamine and one molecule of boron trichloride.

Example No. VI

The procedure employed in this example was the same as that used in Example III, except that 37.0 gms. of monolaurylamine and 23.4 gms. of boron trichloride were used as reactants. The yield of product after the third recrystallization amounted to 47.3 gms. of material having a melting range of 169–172° C. (some decomposition accompanied the melting of this product). A spectrophotometric analysis of this material showed that it was the substantially pure addition compound formed by the reaction of one molecule of monolaurylamine and one molecule of boron trichloride.

Each of the products formed in Example Nos. III–VI dissolved in water without decomposition, and was a useful detergent.

Example No. VII 71.5 gms. of boron trichloride was cooled in a Dry-Ice bath to about −20° C., completely condensing the gas. The weighed liquid was then poured into twice its volume of benzene which was cooled to −5° C., and this solution was thereafter poured into a precooled solution of 488 gms. (4 mols per mol of boron trichloride) of a mixture of amines (corresponding in alkyl chain lengths to the fatty acids normally obtainable from coconut oil, analyzing more than 98% pure as monoamine based on an average molecular weight of 200, and having a melting point of approximately −10° C. and a boiling range of 75–350° C. at atmospheric pressure) in an equal volume of benzene. An exothermic reaction took place. Upon cooling, the solution turned into a gel which was difficult to filter. The gel was therefore spread out in an evaporating dish to increase its surface, and the benzene was permitted to evaporate, leaving a dark brown mass. The mass was dissolved in hot ethyl acetate, and a white crystalline precipitate separated therefrom on cooling. After three such crystallizations there remained 415 gms. (74% of the theoretical yield) of the addition compound of four molecules of the amines and one molecule of the boron trichloride, the compound being composed of pure white, fluffy crystals having a melting range of 166–168° C. These crystals were soluble in water without decomposition, and when dissolved in water lowered the surface tension thereof as the following table shows:

| Surface tension at 25° C. | Concentration |
| --- | --- |
| | Percent |
| 29.6 dynes/cm | 1 |
| 29.6 | .1 |
| 45.2 | .01 |

Example No. VIII 26.6 gms. of aluminum tribromide was added in small increments and with stirring to 74 gms. (4 mols per mol of aluminum tribromide) of monolaurylamine. When the reaction had stopped and the flask had cooled, ether was added and white crystals remained suspended therein. The crystals were thereafter filtered and recrystallized from dioxane. The yield of crystals amounted to 75 gms. of the complex formed by the addition of four molecules of the amine to one molecule of aluminum tribromide. The product had a melting point of 195° C. and lowered the surface tension of water in accordance with the date of the following table:

| Surface tension at 25° C. | Concentration |
|---|---|
| | Percent |
| 29.5 dynes/cm | 1 |
| 41.0 | .1 |
| 55.2 | .01 |

Example No. IX 199.8 gms. of monolaurylamine was dissolved in six volumes of benzene, after which 67.5 gms. of boron tribromide (4 mols of amine per mol of boron tribromide) was added very slowly with constant stirring. An exothermic reaction took place, and therefore the reaction flask was immersed at intervals in an ice bath. After the addition of the boron tribromide had been completed, the reaction mixture was allowed to cool, upon which crystals separated. The benzene was permitted to evaporate, and the material remaining as a residue was recrystallized from ethyl acetate, yielding 202 gms. of the addition product of four molecules of amine per molecule of boron tribromide (75% of the theoretical yield) having a melting range of 128–134° C. The ethyl acetate filtrate contained no unreacted amine, but retained approximately 65 gms. of unrecovered addition product. The product formed clear solutions in water and was a useful detergent.

Example No. X 30 gms. of iodine was placed in a large Pyrex test tube and heated to approximately 180° C., after which 2 gms. of aluminum ribbon was cut into small pieces and dropped into the molten iodine while a carbon dioxide blanket was maintained over the entire mixture. The mass ignited, giving off brown and white fumes. On cooling, it was estimated that about 0.4 gm. of aluminum metal was unreacted, the remainder of the material being aluminum iodide and iodine. This residue was gently heated under a vacuum to volatilize the iodine, leaving a brownish white material having a melting range of 189–194° C. This material was essentially aluminum triiodide.

The material prepared as described in the previous paragraph, weighing 26 gms. (0.65 mol), was placed in a beaker, and 85 gms. of monolaurylamine (4.2 mols) was thereafter added dropwise to the crude mixture with constant stirring. An exothermic reaction resulted. On cooling, the contents of the beaker caked, and a small excess of amine (15 gms.) was added again to insure complete reaction. The cake was heated and then dissolved in hot ethyl acetate, after which the aluminum metal and other unreacted materials were filtered off. Upon cooling the ethyl acetate, there precipitated a product which was recrystallized from solution in ethyl acetate. The recrystallized product had a melting point of 89° C., and a 0.01% solution thereof in water had a surface tension of 56.2 dynes per cm. at a temperature of 25° C. An analysis of this product showed that it was the addition compound formed by the reaction of four molecules of the amine with one molecule of the aluminum iodide.

Example No. XI

A crude aluminum iodide product was prepared as described in Example V and was then placed in a 500 ml. three-necked flask, equipped with a thermometer, a condenser and a gas inlet tube. The flask was heated to 190° C. in order to melt the aluminum triiodide, and boron trifluoride was then slowly admitted to the flask. There followed a reaction which was clouded by the white fumes of aluminum fluoride formed. However, there was obtained a low melting distillate (boron triiodide) which solidified near the outlet of the condenser. About 20 gms. of this product was thus collected, having a melting range of 40–45° C. 85 gms. (0.425 mol) of monolaurylamine was added to the 20 gms. (0.05 mol) of boron triiodide, and the reaction mixture was allowed to stand at room temperature. White crystals of the addition compound of four mols of the amine to one mol of the halide eventually precipitated from the amine, and these crystals were recrystallized from solution in ethyl acetate. The crystals of addition product melted in the range 73–78° C., and solutions thereof in water had the surface tensions given in the table below:

| Surface tension at 25° C. | Concentration |
|---|---|
| | Percent |
| 38.2 dynes/cm | 0.1 |
| 59.2 | .01 |

Example No. XII 38 gms. of boron trichloride (0.34 mol) was liquefied and added to 100 gms. of cooled benzene. This solution was then poured directly into a solution containing 360 gms. of monostearylamine (1.34 mols) and an equal volume of benzene. Heat was given off and, after permitting the reaction mixture to cool, the mass solidified. This solidified material was twice crystallized from solution in ethyl acetate, yielding 322 gms. of the addition product of four molecules of the amine and one molecule of the halide melting at 154° C. The addition product was a useful detergent.

The foregoing examples illustrate the method of preparation and the addition compounds of the present invention where the amine is reacted with the chloride, bromide or iodide of aluminum or boron. As previously noted, the amines will react with these halides in molar proportions of 1 to 4 to produce stable compounds. I have found, however, that the long-chain amines, used in accordance with my present invention, will not react with aluminum fluoride to produce stable compounds. Therefore, where the halogen constituent of the halide is fluorine, the metal component of the halide should be boron. I have further found that these long-chain amines will not react with boron trifluoride to produce stable compounds in molar proportions greater than 3:1 and, therefore, where boron trifluoride is used as the halide reactant, $n$ of the previously stated generic formula will not be greater than 3.

The following examples illustrate, more particularly, that aspect of my invention where boron trifluoride is used as the halide.

Example No. XIII

A 1,000 ml. flask equipped with a mechanical stirrer, a reflux condenser and an ice bath was charged with 185 gms. (1 mol) of monolaurylamine and 350 ml. of benzene. Gaseous boron trifluoride was allowed to enter the flask through an inlet tube which was kept just above the surface of the reaction mixture, which was stirred continuously as the boron trifluoride entered the flask. When no more boron trifluoride would react with the amine, the flask was weighed and it was noted that 67.8 gms. (1.0 mol) of boron trifluoride had reacted with the amine, showing that the reaction product in the flask was formed by the reaction of one molecule of the amine and one molecule of the boron trifluoride. The reaction mixture was then warmed to dissolve the addition product completely in the benzene, and thereafter cooled in order to precipitate the addition product, which was then filtered and dried. The addition product melted at 86–88° C., and a 0.01% solution thereof in water had an appreciably lower surface tension than pure water.

*Example No. XIV*

50.5 gms. (0.2 mol) of the addition product prepared as described in Example No. XIII was dissolved in 200 ml. of benzene and then mixed thoroughly with 37 gms. (0.2 mol) of monolaurylamine by warming the mixture at 75° C. for one hour. Upon cooling the reaction mixture, there precipitated the addition compound formed by the reaction of two molecules of monolaurylamine and one molecule of boron trifluoride. This product melted at 65–68° C., and a 0.01% solution thereof in water had an appreciably lower surface tension than pure water.

Using the aforementioned addition product formed by the reaction of two molecules of monolaurylamine and one molecule of borontrifluoride, together with an equivalent amount of monolaurylamine, there was similarly formed the addition product of three molecules of monolaurylamine and one molecule of boron trifluoride. This addition product melted at 47–49° C., and a 0.01% solution thereof in water had an appreciably lower surface tension than pure water.

*Example No. XV*

A mixture containing 241 gms. (1 mol) of monocetylamine and 650 gms. of benzene was charged into a reaction flask equipped with a mechanical stirrer, a reflux condenser and an ice bath. Gaseous boron trifluoride was allowed to enter the flask through an inlet tube which was kept just above the surface of the reaction mixture, which was continuously stirred as the boron trifluoride entered the flask. When no more boron trifluoride would react with the amine, the flask was weighed and it was noted that 67.8 gms. (1.0 mol) of boron trifluoride had reacted with the amine, showing that the reaction product in the flask was formed essentially by the reaction of one molecule of the amine and one molecule of the boron trifluoride. The reaction mixture was then warmed to dissolve the addition product completely in the benzene, and was thereafter cooled in order to precipitate the addition product, which was then recrystallized from a further portion of benzene. The addition product was thereafter separated by filtration and dried, yielding a material which melted at 93–95° C. A 0.01% solution thereof in water had an appreciably lower surface tension than pure water.

*Example No. XVI*

A flask equipped with a mechanical stirrer, a reflux condenser and an ice bath was charged with 46.3 gms. (0.15 mol) of the addition compound formed as described in Example No. XV and a solution containing 36 gms. (0.15 mol) of monocetylamine and 150 gms. of benzene. The complex formed as described in Example No. XV and the amine were dissolved in the benzene by warming the mixture to 80° C. and stirring the mixture for one hour. The reaction mixture was thereafter cooled to room temperature to precipitate the addition compound formed by the reaction of two molecules of the amine and one molecule of the boron trifluoride. This compound softened at 57° C. and melted at 66–70° C. A 0.01% solution thereof in water had an appreciably lower surface tension than pure water.

*Example No. XVII*

144.9 gms. (0.6 mol) of monocetylamine was dissolved in 540 ml. of benzene, and the solution was then charged to a reaction flask. 28.3 gms. (0.2 mol) of an ether-boron trifluoride complex was then added dropwise to the reaction mixture with constant stirring and intermittent cooling by immersing the reaction flask in an ice bath. After all the ether-boron trifluoride complex had been added, the entire mixture was stirred at 80° C. for an additional hour. At the end of this time, the mixture was permitted to cool to room temperature, resulting in a precipitation of the addition product formed by the reaction of three molecules of the amine and one molecule of the boron trifluoride. The precipitate was separated by means of filtration and then dried, after which it was recrystallized from a further portion of benzene to yield a product which softened at 65° C. and melted at 70–72° C. Water containing this addition product foamed readily.

*Example XVIII*

73.8 gms. (0.25 mol) of 9-octadecenyldimethylamine was weighed into a 500 cc. three-necked flask equipped with a mechanical stirrer, reflux condenser and inlet tube. 75 gms. of benzene was added as a solvent and then boron trifluoride was bubbled into the solution with stirring until 16.9 gms. (0.25 mol) had been added and absorbed in the solution. The compound did not crystallize upon cooling. However, upon pouring into a flat plate and permitting the benzene to evaporate a tan, soft solid was obtained.

As the examples show, the addition reaction may be effected by simply contacting the amine with the halide, the reaction taking place with or without the use of an inert solvent, such as benzene, toluene, ether, ethyl acetate, dioxane, etc. Where boron trifluoride is used, the reaction may be effected by using gaseous boron trifluoride, the ether-boron trifluoride complex, or the boron trifluoride complex with ethyl acetate, dioxane, etc. Further, the reaction may be effected employing the undiluted amine, provided that it is a liquid at about room temperature or has a relatively low melting point or, as previously noted, with the amine in solution in an inert organic solvent, such as benzene, toluene, cyclohexane, ethyl acetate, dioxane, etc.

Purification of the addition compounds may be accomplished by a conventional method, viz., precipitation of the compounds from solution in an organic solvent and for which purpose the aforementioned solvents have been found to be suitable. The addition products of the present invention may be prepared from any amine having the generic formula $R_3N$ in which at least one R attached to the nitrogen atom has at least eight carbon atoms in the carbon to carbon chain extending from the nitrogen atom, is attached to the nitrogen atom by means of a terminal carbon atom, and is selected from the group consisting of straight-chain alkyl radicals having from eight to eighteen carbon atoms, straight-chain alkenyl radicals having from eight to eighteen carbon atoms, straight-chain alkadienyl radicals having from eight to eighteen carbon atoms, the remaining R's, if any being a substituent selected from the group consisting of hydrogen, alkyl radicals having from one to five carbon atoms, the cyclohexyl radical, the phenyl radical and the benzyl radical. Thus, where R is an alkyl radical, it may be the n-octyl, n-nonyl, n-decyl, n-dodecyl, n-tetradecyl, n-hexadecyl, n-octadecyl, etc. radical. R may also suitably be the 9-octadecenyl, undecenyl, palmitenyl, myristenyl, elaidyl, 9,12-octadecadienyl, etc. radical. The second and third R's attached to the nitrogen atom of the amine, in addition to any of those aforementioned specifically or as a class, may be a hydrogen atom, an alkyl radical having from one to five carbon atoms (e. g., the methyl, ethyl, n-propyl, i-propyl, n-butyl, i-butyl, n-amyl, etc. radical), the cyclohexyl radical, the phenyl radical, or the benzyl radical. Because of their availability, particularly valuable reactants for the preparation of the compounds of the present invention are the saturated primary monoamines having from eight to eighteen carbon atoms in a straight chain and having the amino group attached to a terminal carbon atom, such as monooctylamine, monononylamine, monodecylamine, monododecylamine, monotetradecylamine, monohexadecylamine, monooctadecylamine, etc. For the same reason, other particularly valuable amines for use as a reactant are lauryldimethylamine, undecenyldimethylamine, cetyldiethylamine, cetyldimethylamine, etc.

The complexes of this invention are formed by the addition of one, two, three or four molecules of the amine to a molecule of the halide, with the exceptions previously noted. In the addition of the first molecules of amine to the molecule of the halide, the nitrogen atom is attached to the aluminum or boron atom by a coordinate covalent bond, i. e., the pair of electrons shared by the two atoms is supplied (or donated) by the outer shell of electrons of the nitrogen atom. These compounds may be represented by the formula $R_3NEX_3$, the formula indicating that the halide atoms are attached to the aluminum or boron atoms by normal covalent bonds (shared electrons). These compounds do not ionize materially in water to yield the halide ion, and are less soluble in water than the products prepared by the addition of two, three and four molecules of the amine to each molecule of halide. These compounds formed by the addition of one molecule of the amine to one molecule of the halide are soluble in various organic solvents (e. g., ethyl acetate, benzene, toluene, alcohol, ether, dioxane, etc.), and are valuable antiseptics, fungicides, larvicides, and bactericides in solution therein, or can be applied from such solutions to various materials, such as textiles.

With the addition of the second molecule of amine to the molecule of the halide there is formed a complex which may be represented by the generic formula $$[(R_3N)_2EX_2] \cdot X$$

the formula indicating that the nitrogen atoms are attached to the aluminum or boron atoms by coordinate covalent bonds, that the halide atoms within the brackets are attached to the aluminum or boron atoms by normal covalent links, and that the halide atom without the bracket has a negative charge and is attached to the residue of the complex by an electrovalent bond. These complexes ionize in water to yield the positively charged $[(R_3N)_2EX_2]$ ion and the negatively charged X ion. Similar remarks apply with respect to the complexes which are formed by the addition of the third and fourth molecule of the amine to the molecule of the halide, the former giving rise to compounds which may be represented by the formula $$[(R_3N)_3EX] \cdot 2X$$

and the latter giving rise to compounds which may be represented by the formula $$[(R_3N)_4E] \cdot 3X$$

The water-solubility of the complexes increases with increase in the number of amine molecules added to the halide molecule, maximum water-solubility being reached when the number of amine molecules reaches four, where a boron, or aluminum chloride, iodide, or bromide is used, and three, where the halide used is boron trifluoride.

The complexes of this invention are valuable compounds of matter because of their varied utility. Thus, they are stable when dissolved in water, and are useful detergents, wetting agents and emulsifying agents. They are also useful antiseptics (e. g., when tested at 20° C. in accordance with the standard F. D. A. phenol coefficient technique, or the Klarman and Wright first modification thereof, on *E. typhii*, or when tested at 20° C. in accordance with the standard F. D. A. phenol coefficient technique on *E. typhii* and *Staphylococcus aureus*) and fungicides (e. g., when tested on *Aspergillus niger* and *Rhizopus delemar* in accordance with the method proposed by Fernbach et al. on page 8 of volume 39 (year 1940) of the Journal of Bacteriology). The compounds of this invention also find additional uses as larvicides (e. g., for preventing the attack on wool of the black carpet beetle), as insecticides, as anti-perspirants (e. g., when contained in a non-ionic cream base, alcohol, lanolin, etc.), as cationic finishing agents for textiles (e. g., cotton, cellulose acetate, etc.) for giving them a soft hand, and for antisepticizing leather. Although the solubility of the boron trifluoride complexes in water is relatively low, they can be easily dispersed in water (or dissolved in organic solvents) and applied to textiles, wood, etc. from such solution or dispersion. In such products they function as efficient fungistatic and bacteriostatic agents. They can be incorporated directly into paints and lacquers where they function as spreading agents and retard the growth of fungi in such films.

The present application is in part a consolidation of my copending applications Serial Nos. 740,721, and 740,722 filed April 10, 1947, now abandoned.

I claim:

1. A compound having the composition represented by the formula

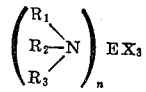

in which $R_1$ is selected from the group consisting of the alkyl, alkenyl and alkadienyl radicals having from 8 to 18 carbon atoms in a straight chain with a terminal carbon atom of the chain attached to the nitrogen atom, $R_2$ and $R_3$ are selected from the group consisting of hydrogen, alkyl radicals containing from 1 to 5 carbon atoms, the cyclohexyl radical, the phenyl radical and the benzyl radical, E is an element selected from the group consisting of aluminum and boron, and when X is selected from the group consisting of chlorine, bromine and iodine $n$ is an integer from 1 to 4, and when E is boron and X is fluorine, $n$ is an integer from 1 to 3.

2. A compound having the composition represented by the formula

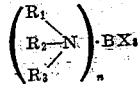

in which $R_1$ is selected from the group consisting of the alkyl, alkenyl and alkadienyl radicals having from 8 to 18 carbon atoms in a straight chain with a terminal carbon atom of the chain attached to the nitrogen atom, $R_2$ and $R_3$ are selected from the group consisting of hydrogen, alkyl radicals containing from 1 to 5 carbon atoms, the cyclohexyl radical, the phenyl radical and the benzyl radical, and X is a halogen and $n$ is an integer from 1 to 3.

3. A compound having the composition represented by the formula

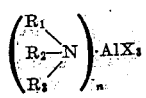

in which $R_1$ is selected from the group consisting of the alkyl, alkenyl and alkadienyl radicals having from 8 to 18 carbon atoms in a straight chain with a terminal carbon atom of the chain attached to the nitrogen atom, $R_2$ and $R_3$ are selected from the group consisting of hydrogen, alkyl radicals containing from 1 to 5 carbon atoms, the cyclohexyl radical, the phenyl radical and the benzyl radical, and X is selected from the group consisting of chlorine, bromine and iodine and $n$ is an integer from 1 to 4.

4. A complex of boron trifluoride and a primary alkyl amine wherein the alkyl group contains from 8 to 18 carbon atoms in a straight chain with a terminal carbon atom of the chain attached to the nitrogen atom of the amine.

5. A complex as defined in claim 4 wherein the ratio of the amine to boron trifluoride is 2 to 1.

6. A complex as defined in claim 4 wherein the ratio of the amine to boron trifluoride is 3 to 1.

7. A complex of boron trifluoride and mono lauryl amine.

8. A compound as defined in claim 7 wherein the ratio of the amine to the boron trifluoride is 2 to 1.

9. A compound as defined in claim 7 wherein the ratio of the amine to the boron trifluoride is 3 to 1.

10. A composition comprising a boron halide of a coconut oil amine.

11. A composition consisting of a mixture of boron halides of coconut oil amines.

12. A complex of aluminum trichloride and a primary alkyl amine wherein the alkyl group contains from 8 to 18 carbon atoms in a straight chain with a terminal carbon atom of the chain attached to the nitrogen atom of the amine.

13. A complex of aluminum trichloride and mono lauryl amine.

14. A complex of a boron halide and a secondary alkyl amine having an alkyl group containing from 8 to 18 carbon atoms in a straight chain with a terminal carbon atom of the chain attached to the nitrogen atom of the amine.

15. A complex of boron trifluoride and a secondary alkyl amine containing an alkyl group having from 8 to 18 carbon atoms in a straight chain with a terminal carbon atom of the chain attached to the nitrogen atom of the amine.

FRANK J. SOWA.

References Cited in the file of this patent

UNITED STATES PATENTS

| Number | Name | Date |
|---|---|---|
| 2,291,400 | Miller | July 28, 1942 |

OTHER REFERENCES

Kraus et al., "J. Am. Chem. Soc.," vol. 51 (1929), pp. 2690 to 2696.